Jan. 18, 1949.          R. F. ROBEY           2,459,454
                   CONCENTRATION OF PIPERYLENE
                      Filed Dec. 29, 1945
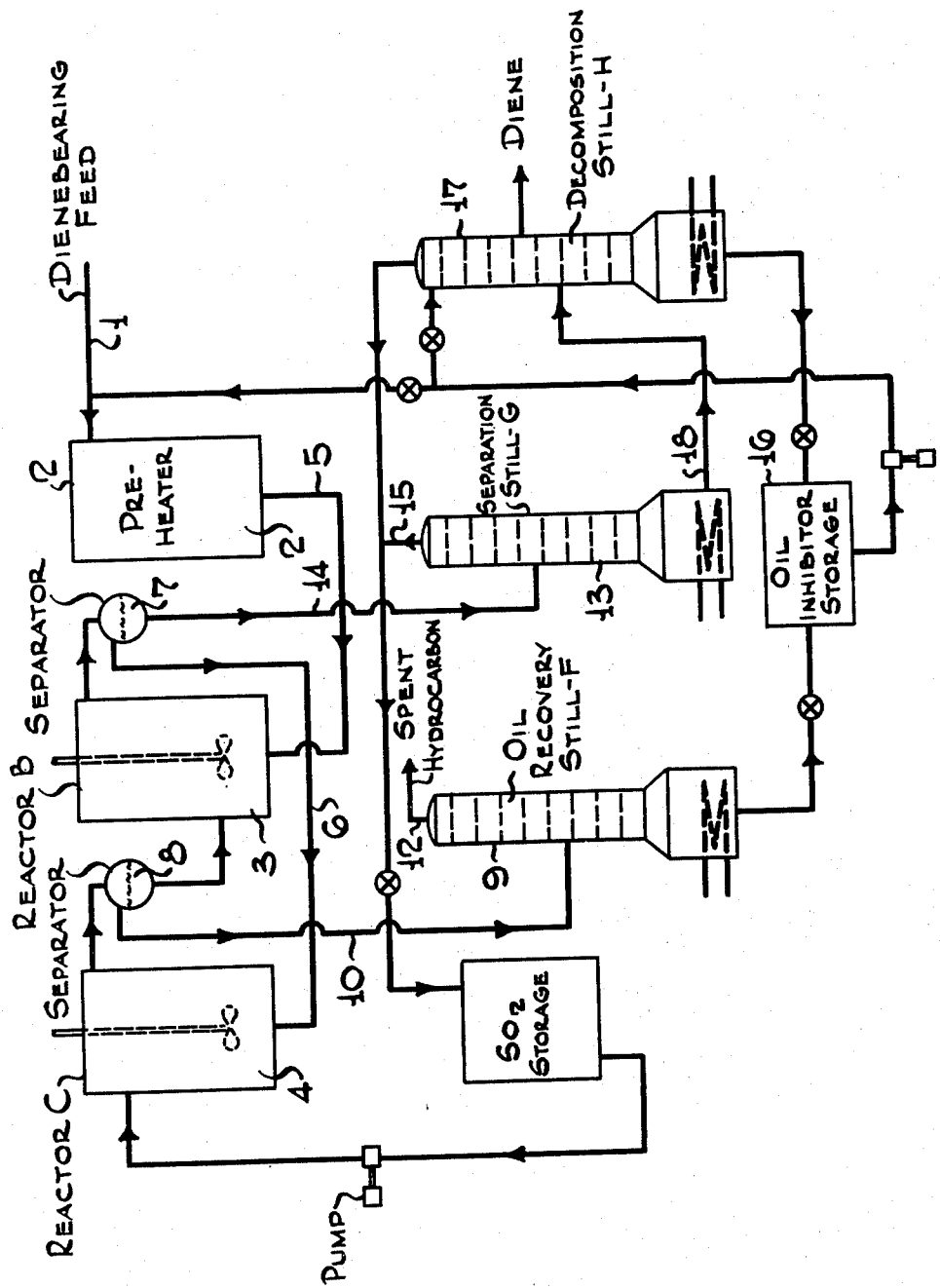
Richard F. Robey   Inventor
By _____ Attorney Patented Jan. 18, 1949

2,459,454

UNITED STATES PATENT OFFICE 2,459,454

CONCENTRATION OF PIPERYLENE

Richard F. Robey, Cranford, N. J., assignor to Standard Oil Development Company, a corporation of Delaware Application December 29, 1945, Serial No. 638,520

2 Claims. (Cl. 260—681.5)

This invention relates to separation and concentration of piperylene (pentadiene-1,3) from mixtures of hydrocarbons and particularly from those mixtures of hydrocarbons having five carbon atoms to the molecule, and also to certain higher diolefins.

Sulfur dioxide, generally has been used in liquefied form under pressure, for separating diolefins from hydrocarbon mixtures containing olefins and diolefins but, heretofore, difficulties have been encountered as the diolefin tends to form polymers as indicated by the appearance of a curdy precipitate during the course of the reaction. This polymer or polysulfone precipitate is insoluble in most organic solvents and water. Attempts have been made in the past to avoid the formation of the polymers, first by the use of anti-oxidants such as hydroxy-benzene compounds, for example, phenol, pyrogallol, resorcinol, etc. The use of such anti-oxidants at ordinary temperatures is somewhat effective in reducing the formation of polymers but substantial losses of diolefins and fouling of equipment by the formation of such polymers are not entirely eliminated. Another method, known in the older art, for reducing the formation of polymers involves decreasing the amount of sulfur dioxide used to react with the diolefins, that is, successively treating hydrocarbon mixtures containing diolefins with small amounts of sulfur dioxide. This procedure renders the process of separating diolefins very tedious and expensive to operate. The yields of piperylene obtained by following this process are relatively small.

Piperylene generally comprises two geometrical isomers. The reaction of one part by weight of sulfur dioxide with two parts of a hydrocarbon mixture containing both the trans-isomer and cis-isomer of piperylene is usually quite incomplete at a reaction temperature of 80°–100° C. and under the corresponding vapor pressures with the trans-isomer of piperylene. The cis-isomer reacts very little, if at all, with SO₂. This difference of reactivity may be applied in a process of separation of the two isomers of piperylene and is the subject of the current patent application Serial No. 414,687, filed October 11, 1941, now abandoned, for Charles E. Morrell and Richard F. Robey.

The reaction between trans-piperylene and sulfur dioxide may be represented:

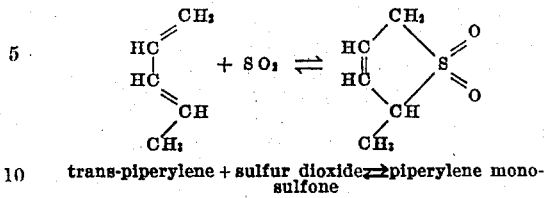

trans-piperylene + sulfur dioxide ⇌ piperylene monosulfone

As stated above, this reaction tends to be incomplete at temperature levels where practical reaction velocities are attained. Moderately high conversions to monosulfone can be attained only by the use of quantities of liquid SO₂ in excess of one-half the weight of the hydrocarbon to be treated. The use of such excesses will lead to almost complete diversion of the reactants to the formation of undesired piperylene polysulfone unless the hydrocarbon is pretreated with an anti-oxidant by a process described in a current patent application Serial No. 504,380, filed September 30, 1943, now Patent 2,443,270, dated June 15, 1948, for Richard F. Robey and Charles E. Morrell. High conversions to monosulfone can be attained by treatment of piperylene-bearing hydrocarbon with quantities of SO₂ in excess of one-half the weight of hydrocarbon in more than one step or stage.

An object of this invention is to provide a process in which piperylene may be readily and commercially separated from hydrocarbon mixtures, particularly those having five carbon atoms to the molecule, and containing both olefins and diolefins. Another object of this invention is to provide a method in which losses, resulting from the formation of polymers and attendant fouling of equipment when sulfur dioxide is used in the separation of piperylene from hydrocarbon mixtures containing olefins and diolefins, are substantially eliminated.

According to this invention, the separation and concentration of piperlyene from hydrocarbon mixtures is obtained by selective reaction with sulfur dioxide in distinct stages, using an amount of sulfur dioxide initially greater than one-half the weight of the hydrocarbon treated. First, the hydrocarbon mixture is distilled to obtain a hydrocarbon mixture having five carbon atoms to the molecule, boiling in the range of about 36.5° to 50° C. under ordinary pressures to eliminate isoprene boiling 18° to 36.5° C. This mixture is then treated with an oxidation inhibitor or peroxide-destroying material such as alpha-naphthol, pyrogallol, cresol, phenol, tertiary butyl catechol, etc. at 100° C. The sulfur dioxide to be used in the formation of sulfone may be also treated separately with oxidation inhibitors and heated to a temperature of 100° C. for a period of about one hour. Alternately, the reactants, sulfur dioxide and the hydrocarbon mixture may be treated separately by distilling in an oxygen-free atmosphere to remove the polymer-forming bodies. The treated sulfur dioxide is then used to separate piperylene from the treated hydrocarbon mixture in the following manner.

The treated piperylene-bearing hydrocarbon mixture is mixed with a quantity of treated sulfur dioxide in excess of one-half the weight of said hydrocarbon mixture in an autoclave and the mixture heated at about 100° C. until reaction reaches an equilibrium. The unreacted hydrocarbon and sulfur dioxide mixture can then be flashed off from the warm reactor leaving the piperylene monosulfone as residue and the vaporized mixture may then be condensed in an autoclave, heated again to obtain further reaction, etc. in repeated steps with or without the addition of further quantities of treated sulfur dioxide. The combined portions of the residual piperylene monosulfone are readily decomposed by heating to liberate piperylene and sulfur dioxide which may be separated by distillation or other suitable means. The piperylene, after washing with caustic soda solution to remove any residual $SO_2$, is quite pure and comprises almost entirely the trans-isomer.

The process can also be carried out by counter-current or counter-stage treatment of a piperylene-bearing hydrocarbon phase with a sulfur dioxide phase, both preferably liquid. The $C_5$ hydrocarbons are miscible in all proportions with liquid sulfur dioxide at temperatures above 10° C. At temperatures below the critical, phase separation occurs only to some extent, as the diolefin sulfone is formed. It has been found that the introduction of a higher hydrocarbon, preferably of a paraffinic nature, leads to rather complete separation of phases, the upper one containing the oil and the piperylene-bearing hydrocarbon and the lower one, sulfur dioxide and diolefin sulfone, under the above-described optimum conditions for the process. These phases may be subjected to counter-stage action as will be described, with reference to the drawing.

A mixture of saturated and unsaturated hydrocarbons containing piperylene is mixed with an appropriate quantity of an oil solution of a suitable polymerization inhibitor and the mixture passed by pipe 1 to pre-treater 2 where it is maintained at about 100° C. for about one hour. The pretreated mixture is then brought in contact with liquid sulfur dioxide in two or more stages such as in reactors 3 and 4 by means of pipes 5 and 6 with separation of the phases in separators 7 and 8. The essentially hydrocarbon phase or layer in separator 8 is then passed to still 9 by pipe 10 where the oil may be recovered and passed by pipe 10 to storage tank 16 for further use while the spent hydrocarbon is permitted to leave the system by pipe 12. The sulfur dioxide-sulfone phase in separator 7 is passed to still 13 by pipe 14 where the unreacted $SO_2$ is recovered by pipe 15 for further use and the sulfone residue is passed by pipe 18 to the still 17 or any appropriate equipment which will aid in the decomposition of the sulfone upon application of heat and provide for the separation of the resulting diene and sulfur dioxide. The oil solution of inhibitor may be circulated to any portion of the equipment which requires freedom from polymer formation. The crude diene obtained may be further purified by scrubbing with caustic soda solution and redistillation.

*Example 1*

One mol of trans-piperlyene in a hydrocarbon mixture boiling between 36.5° to 50° F., and suitably pre-treated with an oxidation inhibitor, is mixed with 3 mols of pure liquid sulfur dioxide in an autoclave at 100° C. for two to three hours, or until equilibrium is attained. It is then found that only 0.45 mol, or 45%, of the piperylene is converted to sulfone, the remainder being unreacted. The unreacted hydrocarbon and sulfur dioxide is then distilled overhead and the condensate mixture is returned to the autoclave and heated to 100° C. for an additional 2 to 4 hours, where it is found that 0.39 mol of piperylene will react and be converted to sulfone. This give a conversion of 45% in one stage, or 84% in two stages. The sulfone is separated and decomposed by heating to give pure piperylene.

*Example 2*

A similar hydrocarbon mixture containing trans-piperylene, which had been treated with anti-oxidants, and the sulfur dioxide, also free of peroxidizing substances, is mixed at the ratio of one gram-mol of trans-piperylene with one mol of liquid sulfur dioxide, and heated to 100° C. for 4 hours. The equilibrium is attained and the sulfone, on being separated, is found to contain only 45% of the piperylene, 0.55 mol of the piperylene remaining unreacted. A mixture of sulfur dioxide and unreacted hydrocarbon is then removed from the sulfone, an additional amount of anti-oxidant-treated liquid sulfur dioxide being added to the separated sulfur dioxide and unreacted hydrocarbon so that 0.55 mol of piperylene is in contact with 7.2 mols of liquid sulfur dioxide. This mixture is then heated at 100° C. for 4 hours, at the end of which time it is found that 0.47 mol has been converted to the monosulfone. A total of 0.92 mol of trans-piperylene was reacted in the two steps, or 92% of one mol used in the reaction. The sulfone is separated and decomposed by heating to give pure piperylene.

What is claimed is:

1. A continuous process for recovering piperylene from a mixture of hydrocarbons containing five carbon atoms to the molecule by reacting piperylene with liquid sulfur dioxide to form piperylene monosulfone comprising the steps of passing an anti-oxidant treated hydrocarbon mixture containing piperylene in sequence through a first and second reaction zone, contacting the mixture in the first reaction zone with an excess of a liquid sulfur dioxide phase containing dissolved piperylene monosulfone formed in the second reaction zone, passing the reaction products from the first reaction zone to a first separation zone wherein the reaction products separate into a piperlyene monosulfone phase and an unreacted hydrocarbon phase, passing the unreacted hydrocarbon phase to the second reaction zone, contacting the unreacted hydrocarbon phase in the second reaction zone with an excess of anti-oxidant treated liquid sulfur dioxide, maintaining the unreacted hydrocarbon phase and liquid sulfur dioxide in the second reaction zone at a reaction temperature of about 100° C., passing the reaction products from the second reaction zone to a second separation zone wherein the reaction products separate into said liquid sulfur dioxide phase containing dissolved piperylene monosulfone which is passed to the first reaction zone and a second unreacted hydrocarbon phase, removing said second unreacted hydrocarbon phase from the second separation zone for recovery of hydrocarbons therefrom, and passing the piperylene monosulfone phase from the first separation zone to a decomposition zone in which the piperylene monosulfone is decomposed to piperlyene and sulfur dioxide.

2. A method according to claim 1 in which the hydrocarbon mixture containing piperylene is heated in the presence of an oxidation inhibitor to the monosulfone reaction temperature before contacting sulfur dioxide in the first reaction zone.

RICHARD F. ROBEY.

REFERENCES CITED

The following references are of record in the file of this patent:

UNITED STATES PATENTS

| Number | Name | Date |
|---|---|---|
| 1,993,681 | Perkins | Mar. 5, 1935 |
| 2,271,092 | Perkins et al. | Jan. 12, 1942 |
| 2,380,831 | Frey | July 31, 1945 |
| 2,403,054 | Craig | July 2, 1946 |